E. C. EACHEL.
COMBINED TYPE WRITING AND COMPUTING MACHINE.
APPLICATION FILED NOV. 18, 1916.

1,259,379.

Patented Mar. 12, 1918.

WITNESSES:
Arthur A. Johnson
Julius Duckstine

INVENTOR:
Emerson C. Eachel
BY B.C. Stickney
ATTORNEY.

UNITED STATES PATENT OFFICE.

EMERSON C. EACHEL, OF MONTCLAIR, NEW JERSEY, ASSIGNOR TO UNDERWOOD COMPUTING MACHINE COMPANY, OF NEW YORK, N. Y., A CORPORATION OF NEW YORK.

COMBINED TYPE-WRITING AND COMPUTING MACHINE.

1,259,379.  Specification of Letters Patent.  Patented Mar. 12, 1918.

Application filed November 18, 1916. Serial No. 131,984.

*To all whom it may concern:*

Be it known that I, EMERSON C. EACHEL, a citizen of the United States, residing in Montclair, in the county of Essex and State of New Jersey, have invented certain new and useful Improvements in Combined Type-Writing and Computing Machines, of which the following is a specification.

This invention relates to computing machines and particularly to those adapted to be used in combination with a typewriting machine.

In this type of machine, the dial wheels of the totalizer usually can be no wider than a letter-space of the typewriter which is usually a tenth of an inch. For compactness and lightness, the dial is combined with the gear, and to make the numerals as wide and large as possible, the dial wheel has been made in the form of a gear having large wide teeth. The numerals are raised upon the periphery of these teeth.

In manufacturing these dial wheels, whose size is limited, it is important that the numeral shall sharply contrast with the background, so as to be easily read by the operator. The frame-work of the machine and the casing of the totalizer are finished in black, and the numerals are bright and contrasting when finished, so as to have a yellowish effect.

For this purpose, brass has been employed, and since brass tarnishes easily, the desired effect will not be permanent unless the polished brass surface of the numeral is protected by some sort of coating, such as lacquer.

Since the numerals are arranged on the periphery of the gear teeth, which must mesh with the driver gear, and since the dial wheel is minute, it has been found commercially impracticable to coat these numerals with a protecting substance, such as lacquer, which quickly wears off in the meshing of the gears.

The present invention provides a dial gear having numerals of the necessary brightness and contrasting color, without the disadvantage of the wearing off of the lacquer.

This is accomplished, first, by plating the periphery of the dial wheel, including the numerals thereon, with gold. Next the entire periphery of the dial wheels may be finished with a dark enamel, preferably black. The enamel is then hardened, and finally the enamel is removed from the top surface of the numerals.

Other features and advantages will hereinafter appear.

In the accompanying drawings.

Figure 1:
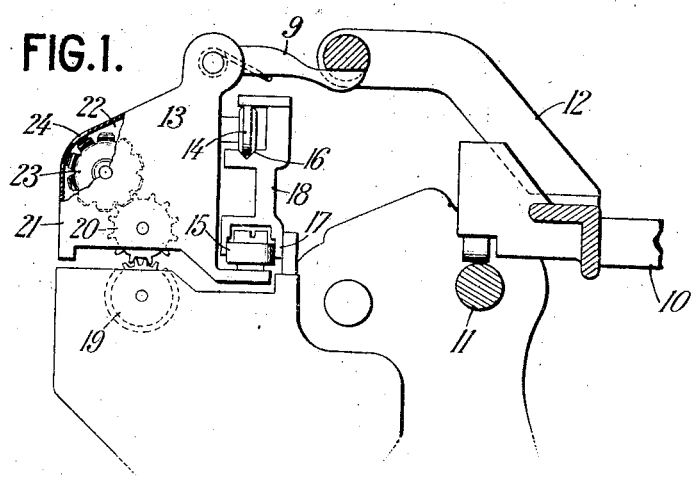
Figure 1 is a side elevation of a part of a combined typewriting and computing machine, showing the dial wheel and its connections to the driver.
Figure 2:
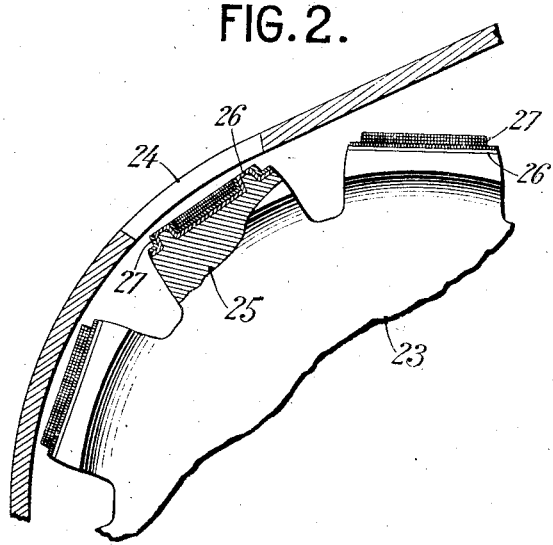
Fig. 2 is a fragmentary side elevation showing on a large scale part of the dial wheel and part of the totalizer frame, including the sight-opening.
Figure 3:
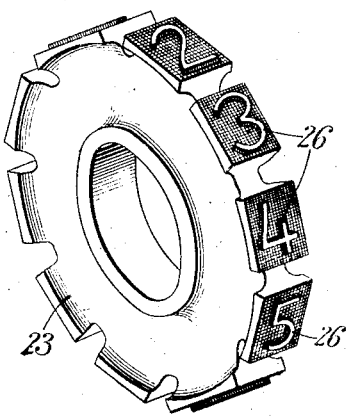
Fig. 3 is a perspective view of the dial wheel.
Figure 4:
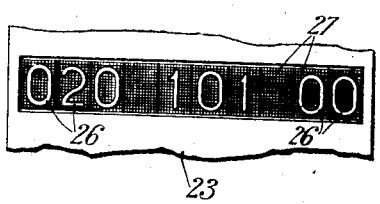
Fig. 4 is a front elevation showing the appearance of the wheels through the sight-opening of the totalizer.

In a combined typewriting and computing machine, of the Underwood Addendagraph type, the typewriter carriage 10 is supported at its forward end upon a rail 11, and moves in letter-feed direction as the type keys are depressed. The typewriter carriage is provided with an arm 12 connected to a totalizer 13 by means of an arm 9. The totalizer 13 may be provided with rollers 14 and 15 riding in tracks 16 and 17, in a supporting rail 18 secured to the front of the machine. The totalizer, being connected to the typewriter carriage, travels step by step as the keys are depressed to compute and print. As the carriage feeds, the totalizer is moved past a master wheel 19, journaled in the frame of the machine.

Driven by the depression of the keys, the master wheel drives each of a series of computing wheels 20 when in coöperation therewith. These computing wheels 20 are journaled on a shaft mounted in the side plates 21 and 22 of the totalizer and in permanent engagement with a series of dial wheels 23 journaled on a shaft also mounted in the side plates of the totalizer. The dial wheels 23 are usually provided with numerals arranged around their periphery, which are visible through a sight-opening 24 in the front plate of the totalizer.

In order that the numerals may be as large as possible, the dial is formed in the shape of a gear having large flat teeth 25. The dial wheel is preferably made of steel.

In order to make the numeral permanently brilliant, I provide the entire periphery of the gear teeth of the dial wheel, including the numerals thereon, with an electro-plating of gold 26, of a suitable quality, gold or gold alloy, that is not liable to tarnish. The entire periphery of the dial is then coated with an enamel 27. This enamel is preferably black for contrast and legibility. The enamel is finally removed from the surface of the numerals. This may be done by a brush or any suitable means. It is advantageous to have the numerals raised from the periphery of the teeth, thus facilitating the removal of the enamel from the surface of the teeth.

It will be seen that a dial wheel manufactured as above will have all the advantage of a long-wearing steel wheel (as compared with a rapidly wearing brass wheel), while a legibility is secured that would not be possible with a steel wheel (steel wheels having been in common use for many years, and being the best form of wheel known prior to my invention), and such legibility is permanent and secured at low cost.

Variations may be resorted to within the scope of the invention, and portions of the improvements may be used without others.

Having thus described my invention, I claim:

1. A totalizer dial wheel having raised numbers thereon and formed of wear-resisting metal of dull color and having its numbered face gold plated and coated with dark material which is removed from the raised surfaces of the gold plated numbers.

2. A totalizer dial wheel consisting of a gear upon the tips of whose teeth are raised numbers, said wheel formed of wear-resisting dull metal and having the numbered tips of said teeth gold plated and coated with contrasting material which is removed only sufficiently to expose the raised surfaces of the gold plated numbers.

3. A totalizer dial wheel having raised numbers thereon and formed of wear-resisting dull metal, and having the outlines of the numbers plated with gold and exposed upon a background of dull contrasting material applied upon said wheel.

4. A totalizer dial wheel formed of wear-resisting dull metal having gear teeth and having raised numerals arranged on the periphery of the gear teeth, said numerals being provided with a plating of gold and having a background of dark material applied upon the wheel.

EMERSON C. EACHEL.

Witnesses:
JENNIE P. THORNE,
ARTHUR A. JOHNSON.